United States Patent
Ahlgrimm (10) Patent No.: US 10,093,034 B2
(45) Date of Patent: Oct. 9, 2018

(54) DEVICE AND METHOD FOR THE HOMOGENISATION OF PLASTICS MATERIAL MELTS

(71) Applicant: Coperion GmbH, Stuttgart (DE)

(72) Inventor: Michael Ahlgrimm, Besigheim (DE)

(73) Assignee: Coperion GmbH, Stuttgart (DE)

( * ) Notice: Subject to any disclaimer, the term of this patent is extended or adjusted under 35 U.S.C. 154(b) by 549 days.

(21) Appl. No.: 14/662,640

(22) Filed: Mar. 19, 2015

(65) Prior Publication Data

US 2015/0266208 A1    Sep. 24, 2015

(30) Foreign Application Priority Data

Mar. 20, 2014   (EP) ..................................... 14160921

(51) Int. Cl.
*B29B 7/42*     (2006.01)
*B29C 47/08*    (2006.01)
(Continued)

(52) U.S. Cl.
CPC .................. *B29B 7/42* (2013.01); *B29B 7/48* (2013.01); *B29C 47/0871* (2013.01); *B29C 47/362* (2013.01); *B29C 47/767* (2013.01); *B29C 47/0009* (2013.01); *B29C 47/0805* (2013.01); *B29C 47/0813* (2013.01); *B29C 47/0818* (2013.01); *B29C 47/0827* (2013.01);
(Continued)

(58) Field of Classification Search
CPC . B29C 47/0871; B29C 47/362; B29C 47/365; B29C 47/6093; B29C 47/702; B29C 47/0813; B29C 47/0818; B29C 47/0869; B29B 7/42; B29B 7/48

USPC ........................................................... 366/83
See application file for complete search history.

(56) References Cited

U.S. PATENT DOCUMENTS 2,627,089 A * 2/1953 Norwood ................ B29C 47/38
106/31.12
3,447,582 A * 6/1969 Street ....................... B01J 10/02
159/2.2

(Continued)

FOREIGN PATENT DOCUMENTS

| CN | 203 093 000 U | 7/2013 | |
| EP | 0 887 172 A1 | 12/1998 | |
| EP | 0887172 A1 * | 12/1998 | ........... B29C 47/362 |
| EP | 2 374 601 A1 | 10/2011 | |
| EP | 2374601 A1 * | 10/2011 | ......... B29C 47/0827 |

OTHER PUBLICATIONS

Machine translation of EP-2374601-A1 having a publication date of Oct. 2011.*

*Primary Examiner* — Walter D. Griffin
*Assistant Examiner* — Marc C Howell
(74) *Attorney, Agent, or Firm* — McGlew and Tuttle, P.C.

(57) ABSTRACT

A device, to homogenise plastics material melts, has a homogenising element with a plurality of flow channels, which differ with respect to at least one feature from the group length, cross sectional area and cross sectional shape. When flowing through the homogenising element, the plastics material melt is divided into a plurality of part streams, which, in each case, flow through an associated flow channel. When leaving the respective flow channel the part streams have different flow speeds so the plastics material melt is expanded and sheared on transition to a uniform flow. As a result, a homogenisation of the plastics material melt takes place in a simple, efficient and effective manner.

22 Claims, 5 Drawing Sheets

(51) Int. Cl.
*B29C 47/36* (2006.01)
*B29C 47/76* (2006.01)
*B29B 7/48* (2006.01)
*B29C 47/00* (2006.01)
*B29C 47/40* (2006.01)
*B29C 47/60* (2006.01)
*B29C 47/70* (2006.01)

(52) U.S. Cl.
CPC ........ *B29C 47/0869* (2013.01); *B29C 47/365* (2013.01); *B29C 47/367* (2013.01); *B29C 47/402* (2013.01); *B29C 47/6031* (2013.01); *B29C 47/6056* (2013.01); *B29C 47/6093* (2013.01); *B29C 47/702* (2013.01)

(56) References Cited

U.S. PATENT DOCUMENTS

| | | | | |
|---|---|---|---|---|
| 3,863,001 | A * | 1/1975 | Thumudo, Jr. | B29B 11/10 264/148 |
| 5,738,884 | A * | 4/1998 | Sato | B29C 47/50 366/82 |
| 6,010,625 | A * | 1/2000 | Whitman | B01D 29/01 210/236 |
| 2010/0015267 | A1* | 1/2010 | Keller | B29C 47/92 425/113 |
| 2014/0039142 | A1* | 2/2014 | Paul | B29C 47/6062 526/295 |

\* cited by examiner

DEVICE AND METHOD FOR THE HOMOGENISATION OF PLASTICS MATERIAL MELTS

CROSS-REFERENCES TO RELATED APPLICATIONS

This application claims the priority of European Patent Application, Serial No. 14 160 921.4, filed Mar. 20, 2014, pursuant to 35 U.S.C. 119(a)-(d), the content of which is incorporated herein by reference in its entirety as if fully set forth herein.

FIELD OF THE INVENTION

The invention relates to a device for the homogenisation of plastics material melts. Furthermore, the invention relates to a method for the homogenisation of plastics material melts.

BACKGROUND OF THE INVENTION

A multi-shaft screw machine for preparing polymer melts is known from EP 2 374 601 A1. Strainer plates having a large number of through-openings for the polymer melt are arranged in the housing bores of the screw machine The polymer melt is conveyed through the through-openings. The polymer melt is divided here into a large number of part streams, so that the surface of the polymer melt is enlarged and the polymer melt is thereby degassed and homogenised.

SUMMARY OF THE INVENTION

The invention is based on an object of providing a device, which, in a simple, effective and efficient manner, allows a homogenisation of plastic material melts.

This object is achieved by a device for the homogenisation of plastics material melts, comprising
- a housing,
- at least one housing channel for a plastics material melt to be homogenised,
  - which is formed in the housing and
  - which extends from a feed opening to a discharge opening,
- at least one homogenising element comprising a plurality of flow channels for the plastic material melt to be homogenised,
  - wherein each of the flow channels has a length defined in a channel longitudinal direction and a cross sectional area defined transverse to the channel longitudinal direction and a cross sectional shape,
  - wherein at least some of the flow channels differ with respect to at least one feature from the group length, cross sectional area and cross sectional shape,
  - wherein the at least one homogenising element is arranged between the feed opening and the discharge opening Since the flow channels of the at least one homogenising element differ with respect to their length, cross sectional area and/or cross sectional shape, different differential pressures are produced along the flow channels, so the part streams of the plastics material melt have different flow speeds and/or flow profiles when leaving the respective flow channel.

During the subsequent transition to a common drag flow profile, starting from the different flow speeds of the part streams, an expansion and shearing occurs, and therefore a mixing and homogenisation of the plastic material melt. In particular the expansion leads to an effective mixing and homogenisation of the plastics material melt. This applies, in particular, to bimodal polymer melts. The cross sectional area and/or the cross sectional shape of the respective flow channel remain constant along its length. Since the free cross sectional areas of the flow channels may be comparatively large, as the homogenising effect substantially depends on the difference in the flow speeds of the part streams, the pressure loss of the plastics material melt along the homogenising element is comparatively small. In addition, the structure of the at least one homogenising element is simple and robust. Overall, the device therefore allows a homogenisation of plastics material melts in a simple, effective and efficient manner.

The device is used, in particular, for homogenising plastics material melts, in particular polymer melts, which have constituents with different viscosities. This is, for example, the case in bimodal polymer melts. By means of the device, in particular gels in bimodal polymer melts can be significantly reduced, so a homogenisation of the bimodal polymer melt takes place.

In a first embodiment, the device is configured as a screw machine, in particular as a multi-shaft screw machine The screw machine has a housing, in which at least one housing channel or at least one housing bore is formed. At least one treatment elementtreatment element shaft, which can be rotatably driven about an associated rotational axis, is arranged in the at least one housing channel or the at least one housing bore. The at least one treatment elementtreatment element shaft comprises at least one shaft, on which treatment elementtreatment elements are non-rotatably arranged consecutively. The at least one homogenising element is arranged between a feed opening and a discharge opening of the screw machine The at least one homogenising element extends into the at least one housing channel or the at least one housing bore and, in particular, has the at least one treatment element shaft passing through it. The at least one homogenising element is, in particular, rigidly connected to the housing. In a multi-shaft screw machine, the treatment element shafts are preferably configured to tightly mesh and can be rotatably driven in the same direction. Downstream of the respective homogenising element, a mixing zone is preferably formed, in which no treatment elements are arranged on the at least one shaft. At least one sleeve is preferably arranged on the at least one shaft in the mixing zone so a free space or mixing space for homogenising and mixing the part streams is formed in the mixing zone. The screw machine is therefore a device for the homogenisation of plastics material melts.

In a second embodiment the device is static. The static homogenising device is, for example, arranged between a screw machine and a granulating device.

The at least one homogenising device is part of a preparation system for preparing plastics materials, in particular polymers. The preparation system comprises, in particular, a homogenising device configured as a screw machine and/or a static homogenising device.

A device, in which the flow channels have at least two different lengths, in particular at least three different lengths, and, in particular, at least four different lengths, ensures an effective homogenisation. Owing to the different lengths, the part streams at the downstream outlet of the flow channels have different flow speeds and/or flow profiles, so an expansion, shearing and mixing of the plastics material melt takes place. The homogenising effect for the respective plastics material melt can be optimised by the number of flow channels of different lengths. The cross sectional area and/or the cross sectional shape of the flow channels is/are the same and/or different.

A device, in which there applies to the ratio of a maximum length $L_{max}$ to a minimum length $L_{min}$ of the flow channels: $L_{max}/L_{min} \geq 1.2$, in particular $L_{max}/L_{min} \geq 1.6$, and, in particular, $L_{max}/L_{min} \geq 2$, ensures an effective homogenisation. The difference in the flow resistances in the individual flow channels and therefore the difference in the flow speeds of the part streams at the downstream outlet of the flow channels is influenced by the ratio of the maximum length $L_{max}$ to the minimum length $L_{min}$. The homogenising effect can be accordingly optimised by the ratio $L_{max}/L_{min}$.

A device, in which there applies to a minimum length $L_{min}$ of the flow channels: $L_{min} \geq 10$ mm, in particular $L_{min} \geq 30$ mm, and, in particular, $L_{min} > 50$ mm, and/or in which there applies to a maximum length $L_{max}$ of the flow channels: $L_{max} \leq 500$ mm, in particular, $L_{max} \leq 300$ mm, and, in particular, $L_{max} \leq 100$ mm, ensures an effective and efficient homogenisation. Owing to the minimum length $L_{min}$, a minimum homogenising effect is ensured, on the one hand, whereas an undesirably high pressure loss is avoided by limiting the maximum length $L_{max}$.

A device, in which the flow channels end flush at an open side, in particular at a side that is downstream in relation to a conveying direction of the plastics material melt, ensures an effective homogenisation. Since the flow channels end flush, the part streams of the plastics material melt meet one another simultaneously at the downstream outlet of the flow channels at, as far as possible, different flow speeds. As a result, an optimal expansion and shearing and, accordingly, an optimal homogenising effect is achieved.

A device, in which the flow channels end offset at an open side, in particular at a side that is upstream in relation to a conveying direction of the plastic material melt, easily ensures an effective homogenisation. The flow channels preferably end offset from one another at the upstream inlet and flush with one another at the downstream outlet. As a result, on the one hand, an effective homogenisation is ensured, while, on the other hand, the structure of the at least one homogenising element is simple. In a first embodiment, the at least one homogenising element has a base plate, which, in particular in the conveying direction of the plastics material melt, has a constant thickness or length, and on which tubes having a different length and optionally additionally a different cross sectional area and/or cross sectional shape, are arranged. The tubes may, for example, be screwed and/or soldered and/or welded to the base plate. The at least one homogenising element can be easily produced and adjusted with respect to the desired homogenising effect by means of screwed tubes. In a second embodiment, the at least one homogenising element is formed from a base body or a base plate, which, owing to material removal in the conveying direction of the plastics material melt, has regions with a different thickness or length. The flow channels are formed in these regions. The base body is machined, for example, by milling or erosion. The flow channels are, for example, formed by bores introduced into the base body.

A device, in which the flow channels have at least two different cross sectional areas, in particular at least three different cross sectional areas, and in particular at least four different cross sectional areas, ensures an effective homogenisation. Different flow distances are produced by the different cross sectional areas, so the part streams at the downstream outlets of the flow channels have different flow speeds and/or flow profiles. A uniform flow is established again downstream of the at least one homogenising element, whereby an expansion and shearing of the part streams and, accordingly, a homogenisation of the plastics material melt, takes place. The length and/or cross sectional shape of the flow channels is/are the same and/or different. The homogenising effect can be adjusted or optimised by the number of different cross sectional areas.

A device, in which there applies to the ratio of a maximum cross sectional area $A_{max}$ to a minimum cross sectional area $A_{min}$ of the flow channels: $A_{max}/A_{min} \geq 1.2$, in particular, $A_{max}/A_{min} \geq 1.6$, and, in particular, $A_{max}/A_{min} \geq 2$, ensures an efficient and effective homogenisation. The homogenising effect can be adjusted by the ratio of the maximum cross sectional area $A_{max}$ to the minimum cross sectional area $A_{min}$, as the difference of the flow speeds changes depending on this ratio. At the same time, it is possible to adjust the free cross sectional area in such a way that the flow resistance and therefore the pressure loss of the plastics material melt are comparatively small.

A device, in which there applies to a minimum cross sectional area $A_{min}$ of the flow channels: $A_{min} \geq 5$ mm$^2$, in particular, $A_{min} \geq 10$ mm$^2$, and, in particular, $A_{min} \geq 15$ mm$^2$, and/or in which there applies to a maximum cross sectional area $A_{max}$ of the flow channels: $A_{max} \leq 1600$ mm$^2$, in particular, $A_{max} \leq 800$ mm$^2$, and, in particular, $A_{max} < 600$ mm$^2$, ensures an efficient and effective homogenisation. Owing to the minimum cross sectional area $A_{min}$ and the maximum cross sectional area $A_{max}$, on the one hand a desired homogenising effect is ensured and, on the other hand, an undesirably high pressure loss is avoided.

A device, in which the flow channels have at least two different cross sectional shapes, in particular at least three different cross sectional shapes, and, in particular, at least four different cross sectional shapes, ensures an effective homogenisation. Owing to the different cross sectional shapes, different flow resistances are achieved, so the part streams at a downstream outlet have different flow speeds and/or flow profiles. A uniform flow is established downstream of the at least one homogenising element, so an expansion and shearing and therefore a homogenisation of the plastics material melt takes place. The length and/or cross sectional area of the flow channels is/are the same and/or different. Owing to the number of different cross sectional shapes, the homogenising effect can be adjusted or optimised. Moreover, the different cross sectional shapes allow an optimal utilisation of the cross sectional area available overall and therefore an optimisation of the free cross sectional area of the flow channels. The pressure loss caused by the at least one homogenising element can be accordingly minimised.

A device, in which the at least one cross sectional shape of the flow channels is selected from the group round, oval, drop-shaped and polygonal, easily ensures an effective homogenisation. A round cross sectional shape is comparatively easy to produce. A comparatively large free cross sectional area of the at least one homogenising element is achieved by a polygonal cross sectional shape, for example a triangular, quadrangular or hexagonal cross sectional shape, so the pressure loss is small.

A device, in which the flow channels run linearly in a channel longitudinal direction, ensures an efficient homogenisation. Owing to the linear course of the flow channels, in particular in the conveying direction of the plastics material melt, a low flow resistance and therefore a low pressure loss are achieved.

A device, in which the flow channels run parallel to one another and, in particular, parallel to a conveying direction of the plastics material melt, ensures an efficient homogenisation. Since the flow channels run parallel to one another and, in particular, in the conveying direction, a comparatively large free cross sectional area is achieved, so the flow resistance and therefore the pressure loss at the at least one homogenising element is small.

A device being configured as a screw machine, in particular as a multi-shaft screw machine, wherein at least one treatment element shaft is arranged in the at least one housing channel, the treatment element shaft being rotatably drivable about an associated rotational axis, wherein the at least one treatment element shaft comprises at least one shaft on which treatment elements are non-rotatably arranged consecutively, wherein the at least one homogenising element extends in the at least one housing channel and is passed through by the at least one treatment element shaft, ensures a simple, effective and efficient homogenisation in a screw machine Preferably, the housing has a degassing opening downstream of the at least one homogenising element.

A device, in which the at least one homogenising element is rigidly connected to the housing, wherein the at least one homogenising element comprises, in particular, a base plate which is fastened between housing portions of the housing, ensures a simple homogenisation in a screw machine.

A device, in which downstream of the at least one homogenising element, a mixing zone is formed in which no treatment elements are arranged on the at least one shaft, wherein in particular at least one sleeve is arranged on the at least one shaft in the mixing zone, ensures an effective and efficient homogenisation due to a free space formed in the mixing zone for homogenisation and mixing of the part streams of the plastics material melt.

A device, in which the device is static, wherein the housing forms a guide bore running transversely to the conveying direction and crossing the housing channel, a slide element being arranged in the guide bore that is displaceable in a direction transverse to the conveying direction by means of an actuating drive, ensures a simple homogenisation.

A device, in which two continuous receiving openings are formed in the slide element, with a homogenising element being mounted in each of said receiving openings, ensures an effective and efficient homogenisation. Depending on the type of the plastics material melt, a suitable homogenising element can be selected by displacing the slide element by means of the actuating drive in a direction transverse to the conveying direction so that the desired homogenising element is arranged in the housing channel.

The invention is further based on the object of providing a method, which allows a simple, effective and efficient homogenisation of plastics material melts.

This object is achieved by a method for the homogenisation of plastics material melts, comprising the following steps:
  providing a device according to the invention and a plastics material melt,
  conveying the plastic material melt in a conveying direction to at least one homogenising element,
  flowing through the at least one homogenising element, in that the plastics material melt is divided into a plurality of part streams and the part streams flow through a respective associated flow channel and on leaving the respective flow channel have different flow speeds,
  establishing a uniform flow of the plastics material melt downstream of the at least one homogenising element such that an expansion and shearing of the part streams takes place.

The advantages of the method according to the invention correspond to the advantages already described of the homogenising element according to the invention and the homogenising device according to the invention. The plastics material melt, when flowing through the at least one homogenising element, is divided into a plurality of part streams, which flow through a respective associated flow channel. When leaving the flow channels, the part streams have at least partially different flow speeds and/or flow profiles. A uniform flow is adjusted downstream of the at least one homogenising element, so an expansion and shearing of the part streams takes place. In particular, the expansion in the conveying direction leads to a mixing and homogenising of the plastic material melt.

Further features, advantages and details of the invention emerge from the following description of a plurality of embodiments.

DESCRIPTION OF THE PREFERRED EMBODIMENTS

Figure 1:
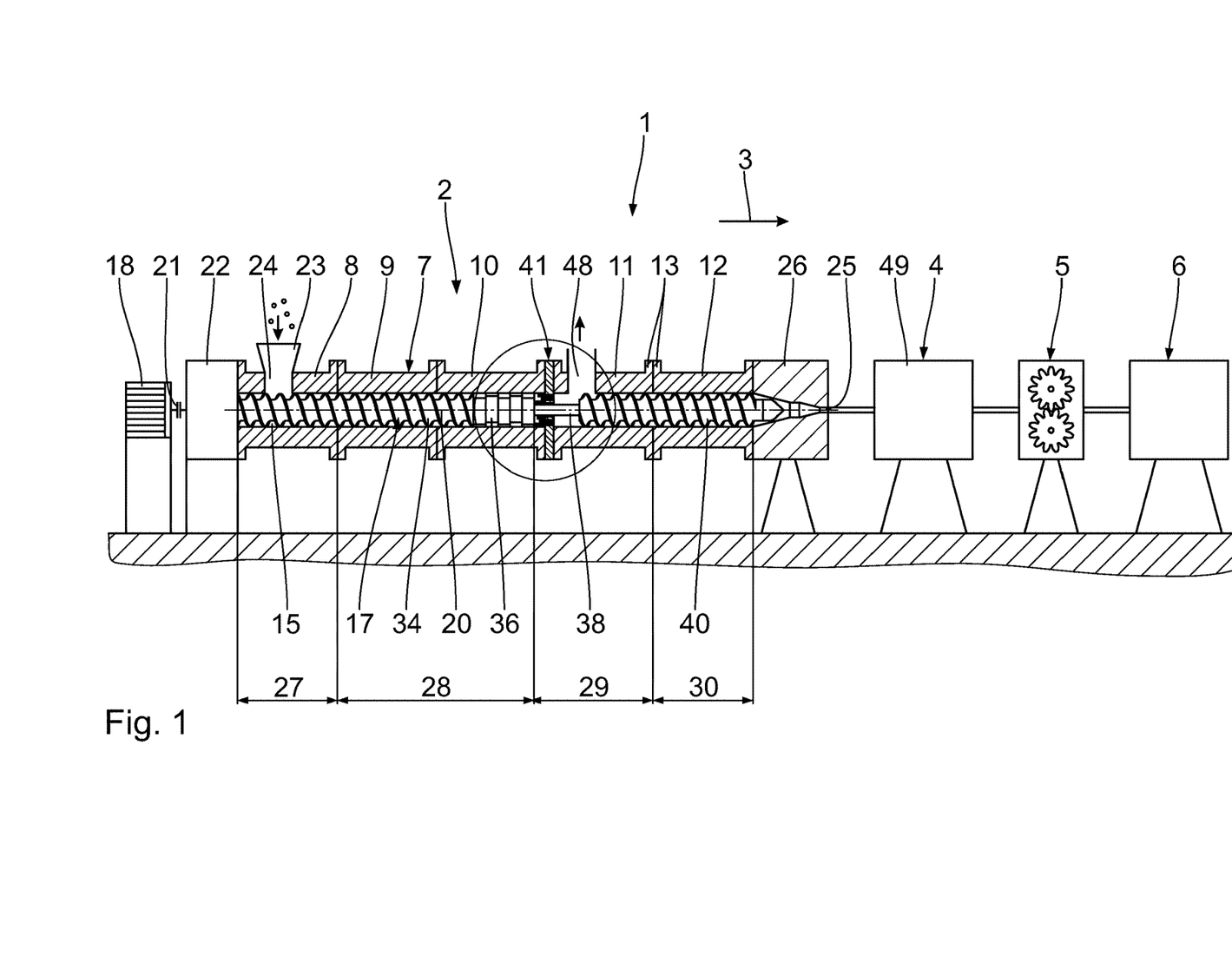
FIG. 1 shows a schematic view of a preparation system for preparing plastics materials with a homogenising device configured as a screw-machine and a downstream static homogenising device.

A preparation system 1, for preparing plastics materials, has a multi-shaft screw machine 2, downstream of which is arranged in a conveying direction 3, a static homogenising device 4, a melt pump 5 and a granulating device 6. The screw machine 2 has a housing 7 made of a plurality of housing portions 8 to 12 arranged one behind the other and called housing sections. The housing portions 8 to 12, at their ends, in each case have flanges 13, by means of which adjacent housing portions 8 to 12 are connected to one another to form the housing 7.

Formed in the housing 7 are two housing bores 14, 15, which are parallel to one another and penetrate one another and which have the shape of a horizontal eight in cross section. The housing bores 14, 15 form a housing channel. Concentrically arranged in the housing bores 14, 15 are two treatment element shafts 16, 17, which can be rotatably driven in the same direction about associated rotational axes 19, 20 by a drive motor 18. A coupling 21 and a branching gearing 22 are arranged between the drive motor 18 and the treatment element shafts 16, 17, one behind the other in the conveying direction 3.

A material feed 23 in the form of a funnel, through which plastics material to be prepared or plastics material melt to be prepared can be introduced via a feed opening 24 into the housing bores 14, 15, is arranged on the first housing portion 8. The plastics material melt K located in the screw machine 2 is discharged at a downstream end of the housing 2 through a discharge opening 25, which is formed in a nozzle plate 26 closing the housing 7.

The screw machine 2, in the conveying direction 3, one after the other, has a feed zone 27, a melting zone 28, a mixing zone 29 and a pressure build-up zone 30. The treatment element shafts 16, 17 in each case have associated shafts 31, 32, on which treatment elements associated with one another pair-wise in each case are non-rotatably arranged one behind the other in the conveying direction 3. First screw elements 33, 34 are non-rotatably arranged on the shafts 31, 32 as treatment elements in the feed zone 27. The first screw elements 33, 34 extend into the melting zone 28, in which disc-shaped kneading elements 35, 36 adjoin as treatment elements. Sleeves 37, 38 are arranged on the shafts 31, 32 in the mixing zone 29. Second screw elements 39, 40 as treatment elements extending to the end of the pressure build-up zone 30, adjoin the sleeves 37, 38. The treatment elements 33 to 36, 39, 40 are configured to mesh tightly pair-wise.

Figure 2:
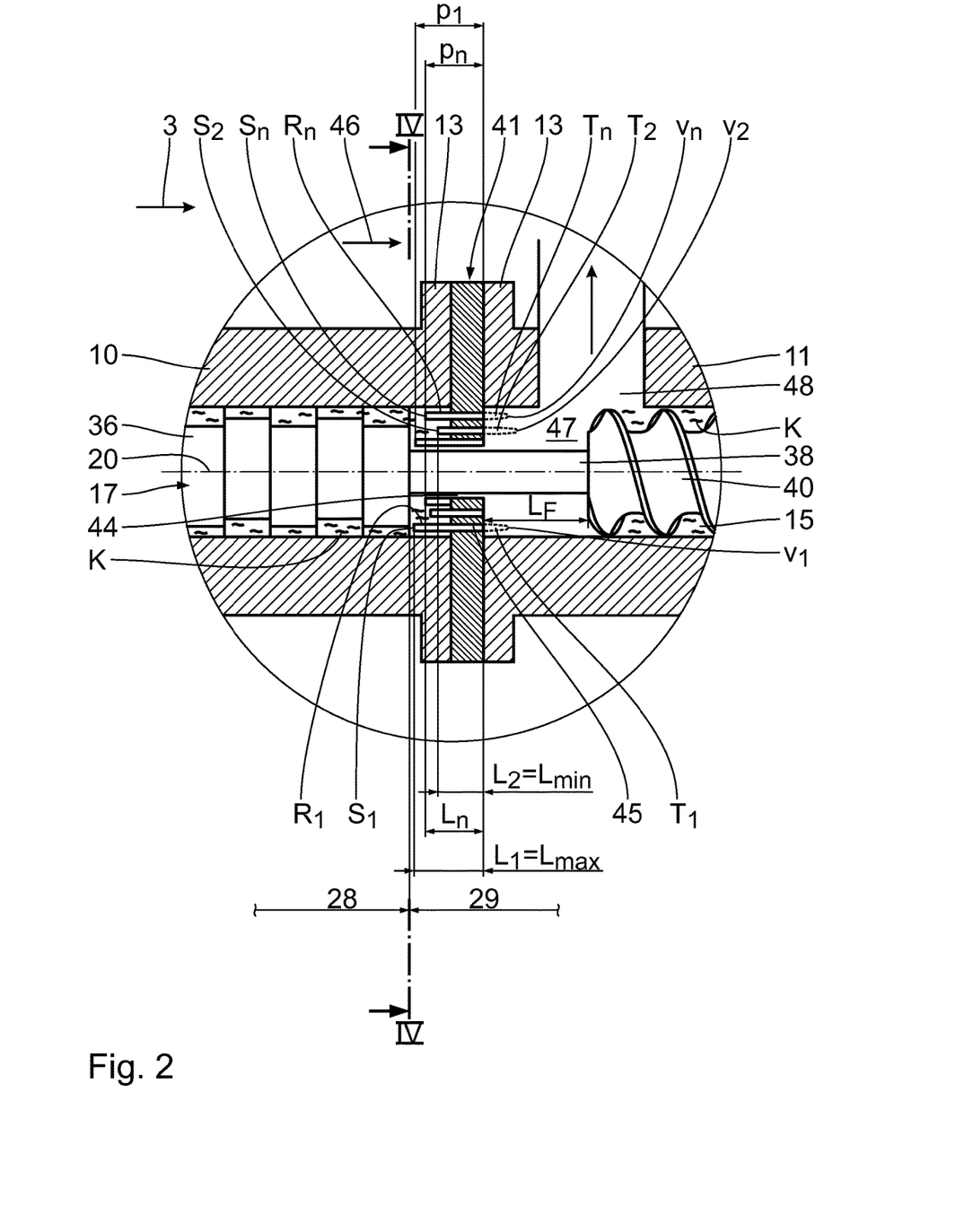
FIG. 2 shows an enlarged view of the screw machine in FIG. 1 in the region of a homogenising element for the homogenisation of the plastics material melt located in the screw machine according to first embodiment.
Figure 3:
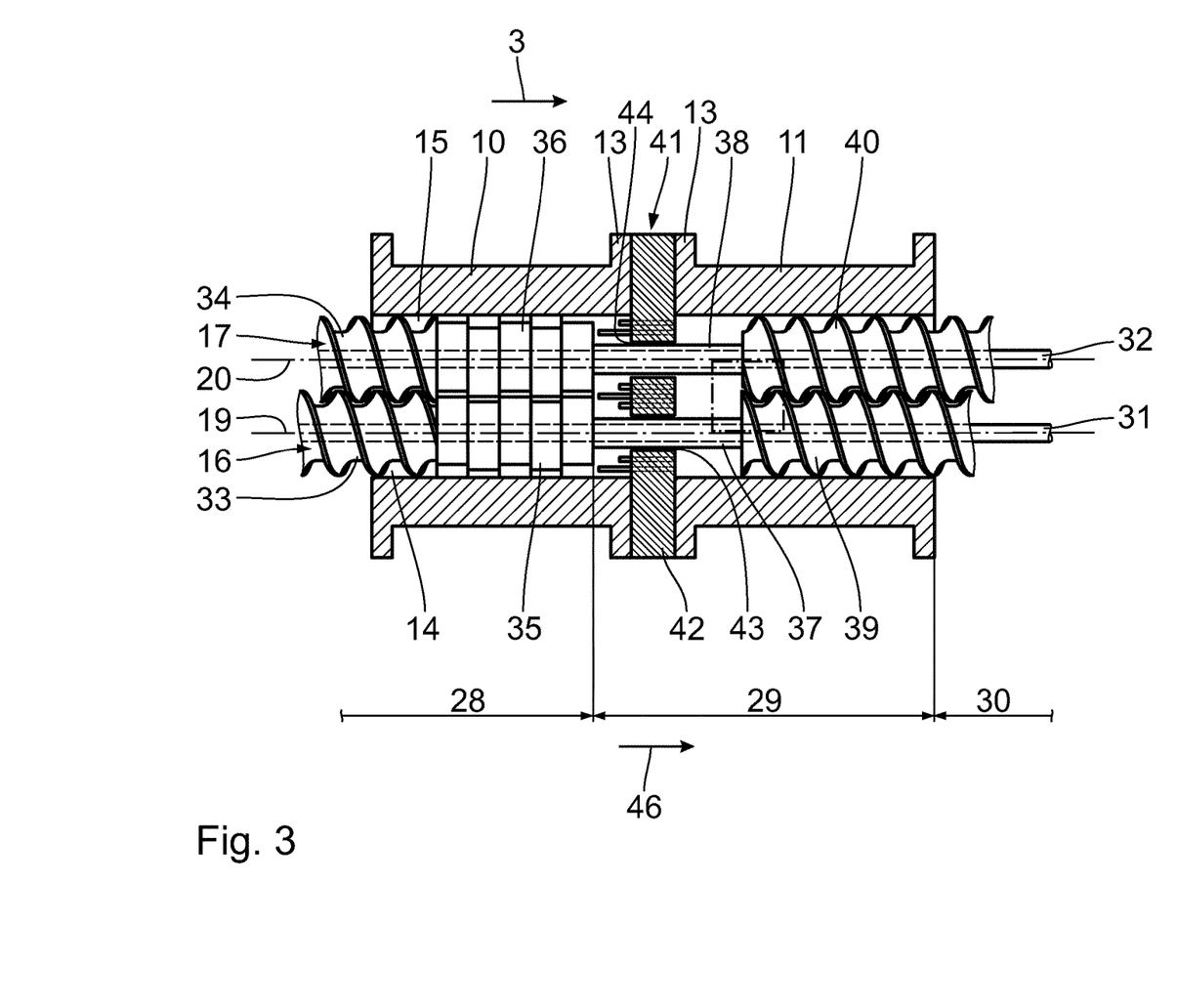
FIG. 3 shows a plan view of the homogenising element in FIG. 2.

For the homogenisation of the plastics material melt K, the multi-shaft screw machine 2 has a homogenising element 41. As a result, the screw machine 2 is used as a homogenising device. The homogenising element 41 is static. The homogenising element 41 comprises a base plate 42, which is fastened between the housing portions 10, 11. The base plate 42 extends, starting from the housing 7, into the housing bores 14, 15 and to guide the shafts 31, 32 through as well as the sleeves 37, 38 arranged thereon, has two shaft through-openings 43, 44. The homogenising element 41 forms a plurality of flow channels, which are individually designated $S_1$ to $S_n$, n designating the number of flow channels. The flow channels $S_1$ to $S_n$ are formed by associated tubes $R_1$ to $R_n$, which are fastened in associated through-openings 45 in the base plate 42. The flow channels $S_1$ to $S_n$ run linearly and parallel to one another in a channel longitudinal direction 46. The channel longitudinal direction 46 runs parallel to the conveying direction 3.

The flow channels $S_1$ to $S_n$ in each case have an associated length $L_1$ to $L_n$ in the channel longitudinal direction 46 and an associated cross sectional area $A_1$ to $A_n$ and an associated cross sectional shape $Q_1$ to $Q_n$ transverse to the channel direction 46. According to the invention, at least some of the flow channels $S_1$ to $S_n$ differ with respect to at least one feature from the group length $L_1$ to $L_n$, cross sectional area $A_1$ to $A_n$ and cross sectional shape $Q_1$ to $Q_n$.

The flow channels $S_1$ to $S_n$ have at least i different lengths L, wherein i designates the number of different lengths L. There applies to i: $2 \leq i \leq n$, in particular $3 \leq i \leq n$, and, in particular, $4 \leq i \leq n$. As shown in FIG. 2, the lengths $L_1$, $L_2$ and $L_n$ are, for example, different. The flow channels $S_1$ to $S_n$ end flush at their downstream open side, in other words downstream in the conveying direction 3 or in the channel longitudinal direction 46. In contrast, the flow channels $S_1$ to $S_n$ end offset from one another at their upstream open side, in other words upstream from the conveying direction 3 or the channel longitudinal direction 46, if the flow channels $S_1$ to $S_n$ differ with respect to their lengths $L_1$ to $L_n$.

The flow channels $S_1$ to $S_n$, in the channel longitudinal direction 46, have a maximum length $L_{max}$ and a minimum length $L_{min}$. In FIG. 2, the flow channel $S_1$ by way of example has the maximum length $L_{max} = L_1$ and the flow channel $S_2$ has the minimum length $L_{min} = L_2$. There applies to the ratio of the maximum length $L_{max}$ to the minimum length $L_{min}$: $L_{max}/L_{min} \geq 1.2$, in particular $L_{max}/L_{min} \geq 1.6$, and, in particular, $L_{max}/L_{min} \geq 2$. Moreover, there applies to the minimum length $L_{min}$ and/or the maximum length $L_{max}$: $L_{min} \geq 10$ mm, in particular $L_{min} \geq 30$ mm, and, in particular, $L_{min} \geq 50$ mm, and/or $L_{max} \leq 500$ mm, in particular $L_{max} \leq 300$ mm, and, in particular, $L_{max} \leq 100$ mm.

Figure 4:
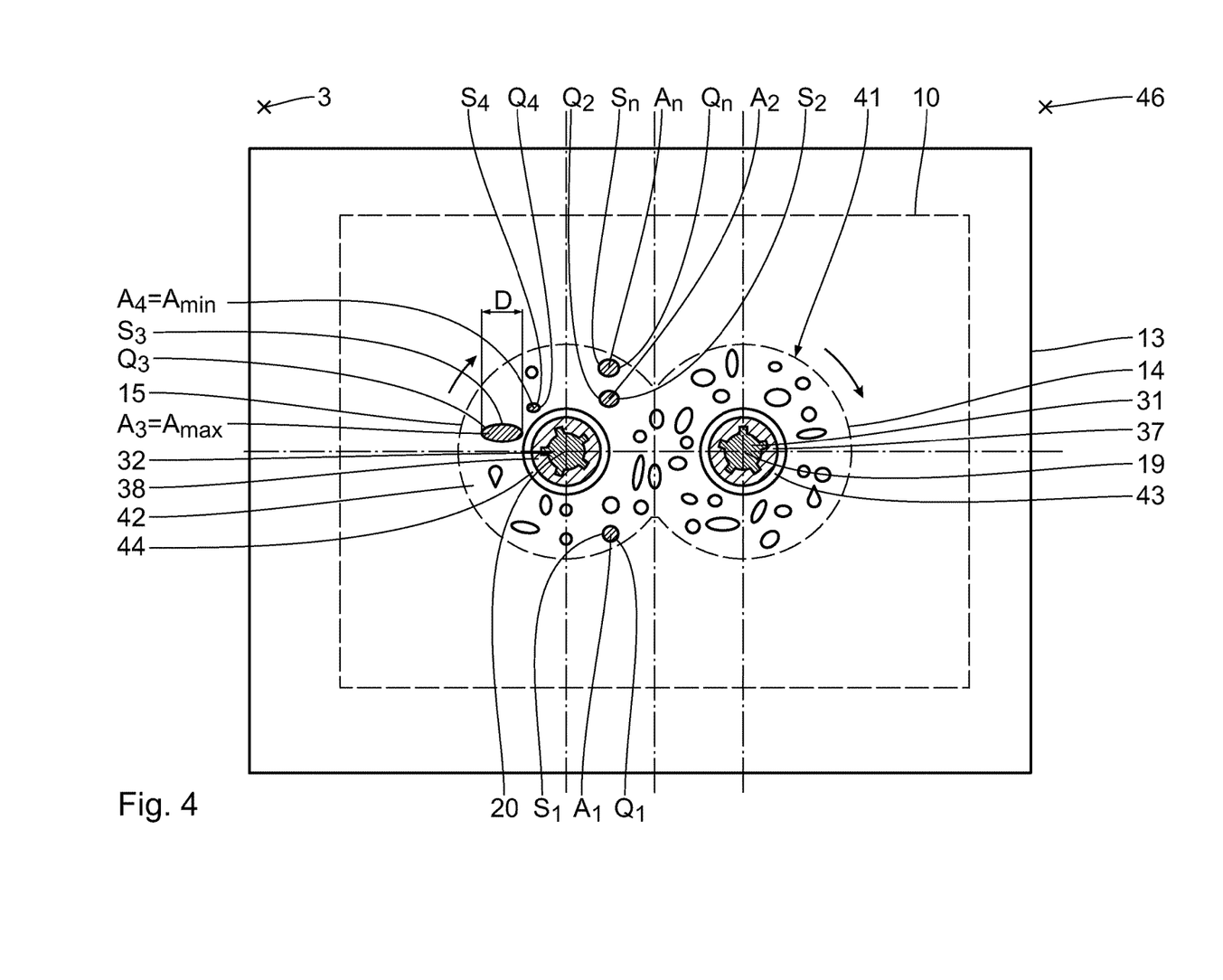
FIG. 4 shows a section in the region of the homogenising element along the section line IV-IV in FIG. 2.

The flow channels $S_1$ to $S_n$ have j different cross sectional areas A, wherein j designates the number of different cross sectional areas A. There applies to j: $2 \leq j \leq n$, in particular $3 \leq j \leq n$, and, in particular $4 \leq j \leq n$. The cross sectional areas $A_1$ to $A_n$ have a maximum cross sectional area $A_{max}$ and a minimum cross sectional area $A_{min}$. In FIG. 4, the cross sectional area $A_3$ of the flow channel $S_3$ by way of example has the maximum cross sectional area $A_{max}$ and the cross sectional area $A_4$ of the flow channel $S_4$ has the minimum cross sectional area $A_{min}$. There applies to the ratio of the maximum cross sectional area $A_{max}$ to the minimum cross sectional area $A_{min}$: $A_{max}/A_{min} \geq 1.2$, in particular $A_{max}/A_{min} \geq 1.6$, and, in particular $A_{max}/A_{min} \geq 2$. Furthermore, there applies to the minimum cross sectional area $A_{min}$ and/or the maximum cross sectional area $A_{max}$: $A_{min} \geq 5$ mm², in particular, $A_{min} \geq 10$ mm², and, in particular $A_{min} \geq 15$ mm² and/or $A_{max} \leq 1600$ mm², in particular $A_{max} \leq 800$ mm² and, in particular, $A_{max} \leq 600$ mm².

Furthermore, the flow channels $S_1$ to $S_n$ have k different cross sectional shapes Q, wherein k designates the number of different cross sectional shapes Q. To k there applies: $2 \leq k \leq n$, in particular $3 \leq k \leq n$, and, in particular $4 \leq k \leq n$. The cross sectional shapes Q of the flow channels $S_1$ to $S_n$ are selected from the group round, oval, drop-shaped and polygonal. The polygonal cross sectional shapes Q are, in particular, selected from the group triangular, quadrangular, pentagonal and hexagonal. FIG. 4 by way of example shows round, drop-shaped and oval cross sectional shapes Q, wherein, for example, the cross sectional shape $Q_1$ is round and the cross sectional shape $Q_3$ is oval.

Downstream of the homogenising element 41, a free space or mixing space 47 is formed in the mixing zone 29 between the housing portion 11 and the sleeves 37, 38. Moreover, the housing 7 has a degassing opening 48 downstream of the homogenising element 41.

The static homogenising device 4 is arranged downstream of the screw machine 2 in the conveying direction 3. The homogenising device 4 has a housing 49, in which is formed a housing channel 50 for the plastics material melt K, said channel running in the conveying direction 3. The housing channel 50 has a feed opening 60 and a discharge opening 61 for the plastics material melt K. Furthermore, formed in the housing 49 is a guide bore 51 crossing the housing channel 50 and running transversely to the conveying direction 3. Arranged in the guide bore 51 is a slide element 52, which can be displaced transverse to the conveying direction 3 by means of an actuating drive 53. The actuating drive 53 is, for example, hydraulic or electromechanical and is merely indicated in FIG. 5.

Figure 5:
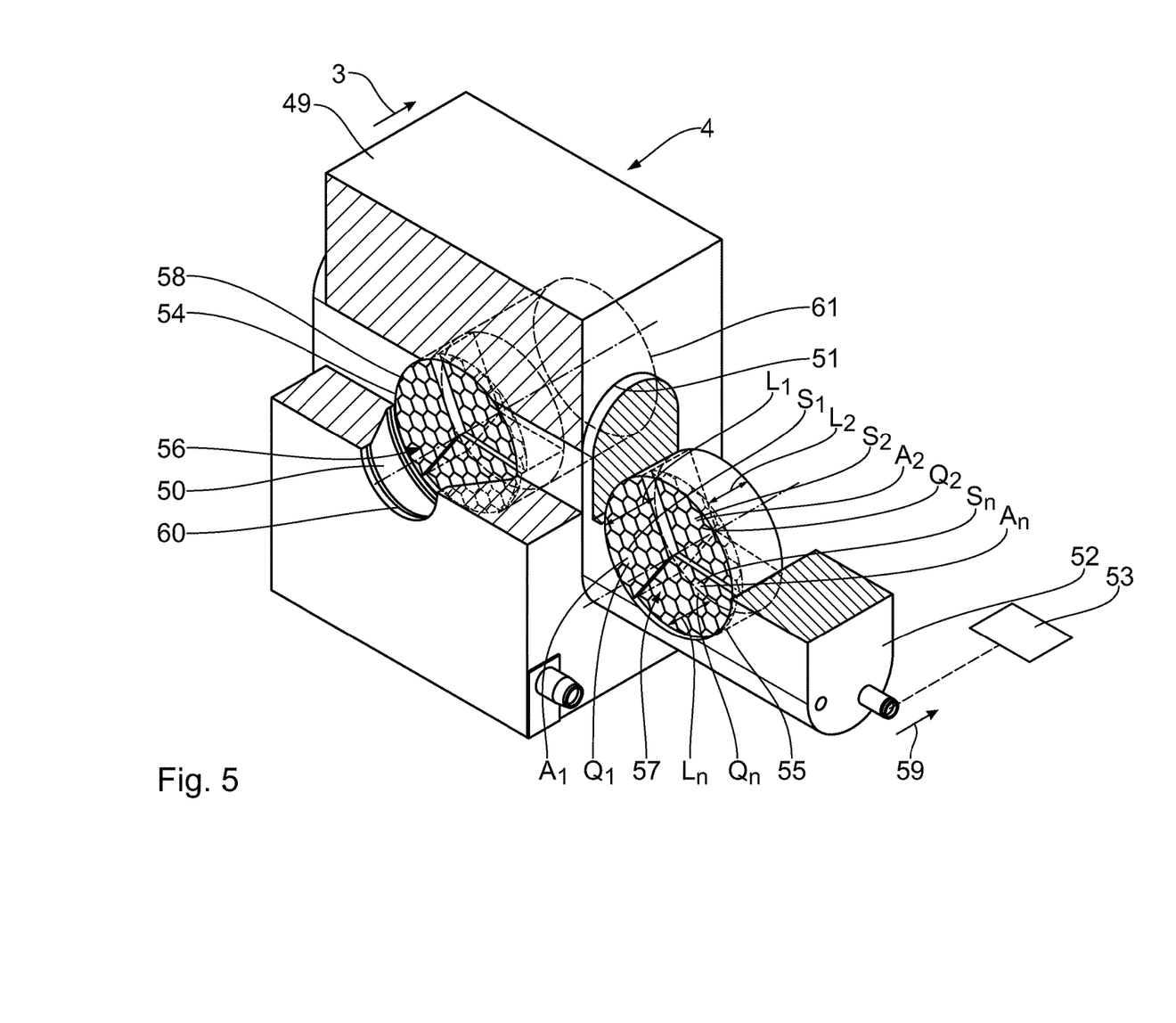
FIG. 5 shows a part section through the static homogenising device in the region of homogenising elements according to a second embodiment.

Two continuous receiving openings 54, 55, in which a static homogenising element 56, 57 is mounted in each case, are formed in the slide element 52. The receiving openings 54, 55 are spaced apart transversely to the conveying direction 3 in such a way that, in each case, one of the homogenising elements 56, 57 is located outside the housing 49 when the respective other homogenising element 56, 57 is located in the housing channel 50.

The homogenising elements 56, 57 in each case have a base plate 58, in which, corresponding to the homogenising element 41, a plurality of flow channels $S_1$ to $S_n$ are formed. The flow channels $S_1$ to $S_n$, in a channel longitudinal direction 59, have associated lengths $L_1$ to $L_n$ and, transverse to the channel longitudinal direction 59, have associated cross sectional areas $A_1$ to $A_n$ and associated cross sectional shapes $Q_1$ to $Q_n$. According to the invention, at least some of the flow channels $S_1$ to $S_n$ differ with respect to at least one of the features from the group length $L_1$ to $L_n$, cross sectional area $A_1$ to $A_n$ and cross sectional shape $Q_1$ to $Q_n$. The homogenising elements 56, 57 have, as shown by way of example in FIG. 5, in particular polygonal cross sectional shapes Q. The different lengths L of the flow channels $S_1$ to $S_n$ were produced, for example, by removing the base plate 58 in part regions. With regard to the further features, reference is made to the homogenising element 41. The homogenising elements 56, 57 may be identical or different with respect to their flow channels $S_1$ to $S_n$.

The melt pump 5 is basically known with respect to the structure and, for example, configured as a gear pump. The melt pump 5 is used to increase the melt pressure for the downstream granulating device 6. The granulating device 6 is also known with respect to the structure and, for example, configured as an underwater granulating device.

The mode of functioning of the preparation system 1 will be described below:

The preparation system 1 is used to prepare and homogenise plastics material melts K. The plastics material melts K have, in particular, constituents with different viscosities. For example, these plastics material melts K are bimodal polymer melts, which are difficult to mix and homogenise and contain undesired gels.

To produce the plastics material melt K, plastics material is fed in a conventional manner through the feed opening 24 into the feed zone 27 of the screw machine 2. The plastics material is conveyed in the conveying direction 3 to the melting zone 28 and melted there to form the plastics material melt K.

The plastics material K is then conveyed to the mixing zone 29 and fed to the homogenising element 41. Owing to the forced conveyance, the plastics material melt K flows through the homogenising element 41, the plastics material melt K being divided because of the flow channels $S_1$ to $S_n$ into corresponding part streams $T_1$ to $T_n$. The part streams $T_1$ to $T_n$ flow through the flow channels $S_1$ to $S_n$, wherein the flow ratios in the individual flow channels $S_1$ to $S_n$ differ from one another because of the different lengths L and/or the different cross sectional areas A and/or the different cross sectional shapes Q. This leads to the fact that the part streams $T_1$ to $T_n$ at the downstream outlet of the homogenising element 41 have different flow profiles and/or different flow speeds $v_1$ to $v_n$. This is illustrated by way of example in FIG. 2, in which flow profiles with flow speeds $v_1$ to $v_n$ of the part streams $T_1$, $T_2$ and $T_n$ are shown.

A uniform flow is adjusted again in the following free space 47 of the mixing zone 29, so that the plastics material melt K or its part streams $T_1$ to $T_n$, on transition to a uniform flow, is subjected to an expansion and shearing. Expansion and shearing forces, which lead to a homogenisation of the plastics material melt K, therefore act on the part streams $T_1$ to $T_n$. In the conveying direction 3, the free space 47 has a length $L_F$. There applies to the length $L_F$, in relation to a maximum dimension D of the flow channels $S_1$ to $S_N$, transverse or perpendicular to the conveying direction 3: $L_F \geq 0.5 \cdot D$, in particular, $L_F \geq 2 \cdot D$ and, in particular, $L_F \geq 4 \cdot D$.

Owing to the differently formed flow channels $S_1$ to $S_n$, an associated differential pressure $p_1$ to $p_n$ of the part streams $T_1$ to $T_n$ from the inlet to the associated outlet of the respective flow channel $S_1$ to $S_n$ is different. These different differential pressures $p_1$ to $p_n$ lead on the outlet side to the different flow profiles and flow speeds $v_1$ to $v_n$, so, during the transition to the common flow or the common flow profile, the expansion and shearing and, correspondingly, homogenisation of the plastics material melt K take place. The difference between the differential pressures $p_1$ to $p_n$ is all the greater, the greater the ratio $L_{max}/L_{min}$ and/or $A_{max}/A_{min}$.

Viewed absolutely, the differential pressures $p_1$ to $p_n$ are comparatively small, however, because of the overall large free cross sectional area $A_1 + \ldots + A_n$ so the homogenising element 41 overall leads to a small pressure loss of the plastics material melt K. Owing to different cross sectional shapes Q and because of the wall adhesion of the plastic material melt K, different flow profiles and flow speeds $v_1$ to $v_n$ can be produced.

Volatile constituents can escape through the degassing opening 48 during the homogenisation. The homogenised plastics material melt K is then conveyed to the pressure build-up zone 30 and discharged there through the discharge opening 25 from the screw machine 2 and fed to the static homogenising device 4. A homogenisation of the plastic material melt K takes place again there, in that the latter flows through one of the homogenising elements 56, 57. With regard to the mode of functioning of the homogenising elements 56, 57, reference is made to statements on the homogenising element 41. In a different configuration of the homogenising elements 56, 57, depending on the type of plastics material melt K, a suitable homogenising element 56, 57 can be selected, in that by means of the actuating drive 53, the slide element 52 is displaced transverse to the conveying direction 3 and the desired homogenising element 56, 57 is arranged in the housing channel 50.

The features of the homogenising elements 41, 56, 57 and the associated homogenising devices 2, 4 can be combined with one another as desired to achieve a desired homogenising effect.

What is claimed is:

1. A device for the homogenization of plastics material melts, the device comprising:
    a housing;
    at least one housing channel for a plastics material melt to be homogenized, the at least one housing channel being formed in the housing, the at least one housing channel extending from a feed opening to a discharge opening;
    at least one homogenizing element comprising a plurality of flow channels for the plastics material melt to be homogenized, the flow channels extending parallel to one another and the flow channels extending parallel to a conveying direction of the plastics material melt, the flow channels ending offset at a side that is upstream in relation to the conveying direction of the plastics material melt, wherein the flow channels end flush at a side downstream in relation to the conveying direction of the plastics material melt, wherein each of the flow channels has a length defined in a channel longitudinal direction and a cross sectional area defined transverse to the channel longitudinal direction and a cross sectional shape, wherein at least some of the flow channels differ with respect to at least one of length, cross sectional area and cross sectional shape, wherein the at least one homogenizing element is arranged between the feed opening and the discharge opening, the device being configured as a screw machine, wherein at least one treatment element shaft is arranged in the at least one housing channel, the at least one treatment element shaft being rotatably drivable about an associated rotational axis, the at least one treatment element shaft comprising at least one shaft on which treatment elements are non-rotatably arranged consecutively, wherein the at least one homogenizing element extends in the at least one housing channel and the at least one treatment element shaft extends through the least one homogenizing element, wherein a mixing space is formed in a mixing zone downstream of the at least one homogenizing element, wherein no treatment elements are arranged on the at least one shaft, wherein the mixing space has a length $L_F$ in the conveying direction and there applies to the length $L_F$ in relation to a maximum dimension D of the flow channels perpendicular to the conveying direction: $L_F \geq 2 \cdot D$, so that the plastics material melt on transition to a uniform flow is subjected to an expansion and shearing.

2. A device according to claim 1, wherein the flow channels have at least two different lengths.

3. A device according to claim 1, wherein a ratio of a maximum length $L_{max}$ to a minimum length $L_{min}$ of the flow channels is greater than or equal to 1.2.

4. A device according to claim 1, wherein the flow channels have a minimum length and a maximum length and at least one of the minimum length of the flow channels is greater than or equal to 10 mm, and the maximum length is less than or equal to 500 mm.

5. A device according to claim 1, wherein the flow channels have at least two different cross sectional areas.

6. A device according to claim 1, wherein a ratio of a maximum cross sectional area to a minimum cross sectional area of the flow channels is greater than or equal to 1.2.

7. A device according to claim 1, wherein the flow channels have a minimum cross sectional area and a maximum cross sectional area and at least one of a minimum cross sectional area of the flow channels is greater than or equal to 5 mm$^2$, and the maximum cross sectional area of the flow channels is less than or equal to 1600 mm$^2$.

8. A device according to claim 1, wherein the flow channels have at least two different cross sectional shapes.

9. A device according to claim 1, wherein the at least one cross sectional shape of the flow channels is one of round, oval, drop-shaped and polygonal.

10. A device according to claim 1, wherein the flow channels extend linearly in a channel longitudinal direction.

11. A device according to claim 1, wherein the device is configured as a multi-shaft screw machine.

12. A device according to claim 1, wherein the at least one homogenizing element is rigidly connected to the housing, wherein the at least one homogenizing element comprises a base plate which is fastened between housing portions of the housing.

13. A device according to claim 1, wherein at least one sleeve is arranged on the at least one shaft in the mixing zone to form the mixing space.

14. A device according to claim 1, wherein the housing has a degassing opening downstream of the at least one homogenizing element.

15. A device according to claim 14, wherein the mixing space and the degassing opening overlap in the conveying direction.

16. A device according to claim 1, wherein the at least one homogenizing element comprises homogenizing element structures, the homogenizing element structures defining the flow channels, each of the homogenizing element structures comprising a flow channel configuration, the flow channel configuration of one of the homogenizing element structures being different from at least the flow channel configuration of another one of the homogenizing element structures.

17. A method for the homogenization of plastics material melts, the method comprising the following steps:
providing a device and a plastics material melt, the device comprising a housing, at least one housing channel for the plastics material to be homogenized and at least one homogenizing element, the at least one housing channel being formed in the housing, the at least one housing channel extending from a feed opening to a discharge opening, the at least one homogenizing element comprising a plurality of flow channels for the plastics material melt to be homogenized, the flow channels extending parallel to one another and the flow channels extending parallel to a conveying direction of the plastics material melt, the flow channels ending offset at a side that is upstream in relation to the conveying direction of the plastics material melt, wherein the flow channels end flush at a side downstream in relation to the conveying direction of the plastics material melt, wherein each of the flow channels has a length defined in a channel longitudinal direction and a cross sectional area defined transverse to the channel longitudinal direction and a cross sectional shape, wherein at least some of the flow channels differ with respect to at least one of length, cross sectional area and cross sectional shape, the at least one homogenizing element being arranged between the feed opening and the discharge opening, the device being configured as a screw machine, wherein at least one treatment element shaft is arranged in the at least one housing channel, the treatment element shaft being rotatably drivable about an associated rotational axis, the at least one treatment element shaft comprising at least one shaft on which treatment elements are non-rotatably arranged consecutively, the at least one homogenizing element extending in the at least one housing channel and the at least one treatment element shaft extending through the least one homogenizing element, wherein a mixing space is formed in a mixing zone downstream of the at least one homogenizing element, wherein no treatment elements are arranged on the at least one shaft, the mixing space having a length in the conveying direction, the length of the mixing space being greater than or equal to two times a maximum dimension of the flow channels such that the plastics material melt on transition to a uniform flow is subject to an expansion and shearing, the maximum dimension of the flow channels being perpendicular to the conveying direction;
conveying the plastics material melt in a conveying direction to at least one homogenizing element;
passing the plastics material melt through the at least one homogenizing element, the plastics material melt being divided into a plurality of part streams and the part streams flow through a respective associated flow channel and on leaving the respective flow channel have different flow speeds;
establishing a uniform flow of the plastics material melt in the mixing space downstream of the at least one homogenizing element such that an expansion and shearing of the part streams takes place.

18. A device for the homogenization of plastics material melts, the device comprising:
a housing;
a housing channel for a plastics material melt to be homogenized, the housing channel being formed in the housing and the housing channel extending from a feed opening to a discharge opening,
a homogenizing element comprising a plurality of flow channels for the plastics material melt to be homogenized, wherein each of the flow channels has a length defined in a channel longitudinal direction and a cross sectional area defined transverse to the channel longitudinal direction and a cross sectional shape, wherein at least some of the flow channels differ with respect to at least one of length, cross sectional area and cross sectional shape, wherein the at least one homogenizing element is arranged between the feed opening and the discharge opening, the device being configured as a screw machine, at least one treatment element shaft being arranged in the at least one housing channel, the treatment element shaft being rotatably drivable about an associated rotational axis, the at least one treatment element shaft comprising at least one shaft on which treatment elements are non-rotatably arranged consecutively, wherein the at least one homogenizing element extends in the at least one housing channel and is passed through by the at least one treatment element shaft, wherein a mixing space is formed in a mixing zone downstream of the at least one homogenizing element, wherein no treatment elements are arranged on the at least one shaft in the mixing space, wherein a length of the mixing space in the conveying direction is greater than or equal to two times a maximum dimension of the flow channels such that the plastics material melt is subjected to an expansion and shearing when the plastics material melt transitions to a uniform flow, the maximum dimension of the flow channels being perpendicular to the conveying direction.

19. A device according to claim 18, wherein at least one sleeve is arranged on the at least one shaft in the mixing zone.

20. A device according to claim 19, wherein the housing has a degassing opening downstream of the at least one homogenizing element.

21. A device according to claim 20, wherein the mixing space and the degassing opening overlap in a conveying direction of the plastics material melt.

22. A device according to claim 18, wherein the at least one homogenizing element comprises homogenizing element structures, the homogenizing element structures defining the flow channels, each of the homogenizing element structures comprising a homogenizing element configuration, the homogenizing element configuration of one of the homogenizing element structures being different from at least the homogenizing element configuration of another one of the homogenizing element structures.

* * * * *